United States Patent Office 3,708,481
Patented Jan. 2, 1973

---

3,708,481
2-ANILINO-NICOTINIC ACID ESTERS
Charles Hoffmann, Enghien-les-Bains, France, assignor to Societe Anonyme dite: Hexachimie Gennevilliers, Hauts-de-Seine, France
No Drawing. Filed Oct. 18, 1968, Ser. No. 768,903
Claims priority, application Great Britain, Oct. 23, 1967, 48,138/67
Int. Cl. C07d *87/40*
U.S. Cl. 260—247.2 B     4 Claims

ABSTRACT OF THE DISCLOSURE

The invention provides novel aminoalkyl esters of 2-anilino-nicotinic acids and their non-toxic salts which are useful anti-inflammatories, antipyretic agents, analgesics, and local anaesthetics.

---

The present invention provides the aminoalkyl esters of 2-anilino-nicotinic acids of the formula:

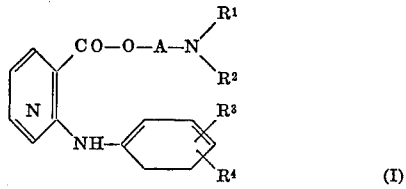

and their acid addition salts with non-toxic acids, especially hydrochlorides, in which A represents a straight or branched lower alkylene radical preferably having 2–4 carbon atoms; $R^1$ and $R^2$ taken separately represent lower alkyl radicals, or, taken together with the nitrogen atom to which they are attached, represent a 5- or 6-membered nitrogen-containing heterocyclic structure which may contain another heteroatom, especially pyrrolidino, piperazine e.g. 1-phenyl-4-piperazino, piperidino or morpholino; and $R^3$ and $R^4$ are identical or different and each represent a hydrogen or halogen atom or a lower alkyl, lower alkoxy or lower halogenalkyl, especially trifluoromethyl, radical. The term "lower" as used herein denotes radicals having at most 4 carbon atoms.

According to a feature of the invention, the esters of Formula I are prepared by condensing the chlorides of a 2-anilino-nicotinic acid with an amino-alcohol in accordance with the equation:

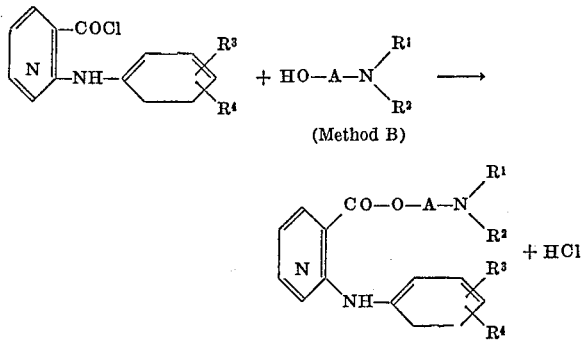

(Method B)

According to a further feature of the invention, the compounds of Formula I are prepared by a process, which is preferred because of its simplicity and because it allows the hydrochlorides of the desired esters to be directly obtained, in which an essentially equimolecular mixture of the 2-anilino-nicotinic acid and the desired alkylaminoalkyl chloride is heated under reflux for 3 to 8 hours in a suitable solvent, preferably anhydrous isopropanol. The hydrochloride of the aminoalkyl ester of the 2-anilino-nicotinic acid crystallises on cooling or after partial concentration. This esterification reaction may be represented as follows:

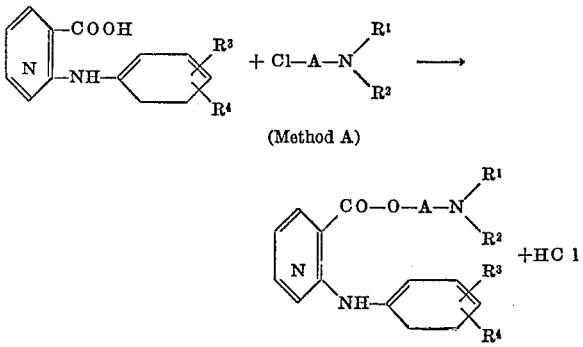

(Method A)

The free base or another acid addition salt may if desired be prepared from the hydrochloride in manner known per se.

The following examples illustrate the invention.

EXAMPLE 1

28.2 g. of 2-(m-trifluoromethylanilino)-nicotinic acid, 11.5 g. of beta-dimethylaminoethyl chloride and 200 ml. of isopropanol are heated under reflux for 8 hours. A small quantity of a white product (arising from the polymerisation of the beta-dimethylaminoethyl chloride) separates out during heating. The mixture is filtered hot, the filtrate is cooled in an ice chest, and crystallisation is initiated by scratching. 16.6 g. of beta-dimethylaminoethyl ester of 2-(m-trifluoromethylanilino)-nictotinic acid hydrochloride (a yield of 42.6%) are obtained, M.P. 120° C. inst.

*Analysis.*—Calculated for $C_{17}H_{18}F_3N_3O_2 \cdot HCl$ (percent): Cl, 10.78; N, 9.09. Found (percent): Cl, 10.84; N, 9.49. This compound is easily soluble in water.

EXAMPLE 2

Method A 30 g. of 2-(m-trifluoromethylanilino)-nicotinic acid in 150 ml. of anhydrous isopropanol are added to a solution of 15 g. of beta-diethylaminoethyl chloride in 70 ml. of isopropanol. The mixture is heated under reflux for 8 hours. After cooling and scratching, beta-diethylaminoethyl ester of 2-(m-trifluoromethylanilino)-nicotinic acid hydrochloride crystallises out. It is filtered off, washed with a mixture of diethyl ether and isopropanol, and recrystallised from 9 volumes of isopropanol. 33 g. of perfectly white product (a yield of 74%) are obtained, M.P. 170° C. This hydrochloride is very easily soluble in water and gives a solution of pH about 6. Ammonia or sodium bicarbonate liberates an oily base which crystallises after cooling in ice and then melts at about 36°–38° C.

*Analysis.*—Calculated for $C_{19}H_{22}F_3N_3O_2 \cdot HCl$ (percent): Cl, 8.49; N, 10.05. Found (percent): Cl, 8.85; N, 10.24.

Method B 8 g. of 2-(m-trifluoromethylanilino)-nicotinic acid chloride (obtained by reaction of thionyl chloride with the acid), dissolved in 30 ml. of anhydrous benzene, are treated with 3.5 ml. of beta-diethylaminoethanol dissolved in 15 ml. of anhydrous benzene, the solution being added slowly with stirring and cooling in an ice bath. A white jelly forms. The mixture is heated for 45 minutes with reflux of the benzene, and an amber yellow solution, which deposits crystals on cooling, is obtained. The crystals are filtered off and 6 g. of crude product are obtained, which after recrystallisation from 9 volumes of isopropanol, yield the beta-diethylaminoethyl ester of 2-(m-trifluoromethylanilino)-nicotinic acid hydrochloride, M.P. 167°–168° C., identical to that obtained by Method A.

EXAMPLE 3

38 g. of 2-(m-trifluoroanilino)nicotinic acid, 19 g. of γ-dimethylaminopropyl chloride and 200 ml. of anhydrous isopropanol are heated under reflux for 8 hours. The mixture is filtered hot and the filtrate is concentrated to half its volume in vacuo. 200 ml. of anhydrous diethyl ether are added and the mixture is then cooled and allowed to crystallise. 35 g. of yellowish crystals of the γ-dimethylaminopropyl ester of 2-(m-trifluoromethylanilino)-nicotinic acid hydrochloride are obtained, and recrystallised from a minimum of isopropanol (about 2 volumes). The product melts at 167° C. inst.

*Analysis.*—Calculated for $C_{18}H_{20}F_3N_3O_2$. HCl (percent): Cl, 8.8; N, 10.4. Found (percent): Cl, 9.09; N, 10.28.

EXAMPLE 4

17.5 g. of 2-(m-trifluoromethylanilino)nicotinic acid, 7.5 g. of beta-dimethylaminoisopropyl chloride and 30 ml. of isopropanol are heated under reflux for 8 hours. The mixture is allowed to crystallise in the cold. 16 g. of beta-dimethylaminoisopropyl ester of 2-(m-trifluoromethylanilino)nicotinic acid hydrochloride are obtained and recrystallised from a mixture of cyclohexane and isopropanol, M.P. 166° C. inst.

*Analysis.*—Calculated for $C_{18}H_{20}F_3N_3O_2$. HCl (percent): Cl, 8.8; N, 10.4. Found (percent): Cl, 9.01; N, 10.49.

EXAMPLE 5

35 g. of 2-(m-trifluoromethylanilino)nicotinic acid, 16 g. of beta-dimethylamino-beta-methyl-propyl chloride and 160 ml. of isopropanol are heated under reflux for 8 hours. The mixture is filtered hot and the filtrate is concentrated to half in vacuo. The solution is precipitated with anhydrous diethyl ether and allowed to crystallise in an ice chest, filtered, and the product recrystallised from isopropanol. 24 g. of beta-dimethylamino-beta-methyl-propyl ester of 2-(m-trifluoromethylanilino)nicotinic acid hydrochloride, M.P. 183° C. are obtained.

*Analysis.*—Calculated for $C_{19}H_{22}F_3N_3O_2$. HCl (percent): Cl, 8.48; N, 10.05. Found (percent): Cl, 8.80; N, 10.06.

EXAMPLE 6

35 g. of 2-(m-trifluoromethylanilino)nicotinic acid, 20 g. of N-beta-chlorethylmorpholine and 160 ml. of isopropanol are heated under reflux for 8 hours. The mixture is ice-cooled and the resulting beta-morpholino-ethyl ester of 2-(m-trifluoromethylanilino)nicotinic acid hydrochloride (20 g.) is filtered off, and recrystallised from 150 ml. of absolute ethanol. It is obtained as yellow crystals M.P. 202° C. inst.

*Analysis.*—Calculated for $C_{19}H_{20}F_3N_3O_3$. HCl (percent): Cl, 8.21; N, 9.70. Found (percent): Cl, 8.6; N, 9.72.

EXAMPLE 7

Method A 35 g. of 2-(m-trifluoromethylanilino)nicotinic acid, 17.5 g. of beta-piperidinoethyl chloride and 80 ml. of anhydrous isopropanol are heated under reflux for 8 hours. The boiling mixture is filtered to remove insoluble material and allowed to crystallise overnight. The beta-piperidino-ethyl ester of 2-(m-trifluoromethylanilino) nicotinic acid hydrochloride is filtered off, washed with a very small amount of cold isopropanol and then with anhydrous diethyl ether, and dried at 95° C. 35 g. of crude product are obtained and are recrystallised from 6–7 volumes of isopropanol to yield 28 g. of pure product, M.P. 189–191° C. (cap.) and 196° C. (inst.).

*Analysis.*—Calculated for $C_{20}H_{22}F_3N_3O_2$. HCl (percent): Cl, 8.24; N, 9.78. Found (percent): Cl, 8.22; N, 9.61.

Method B 15 g. of 2-(m-trifluoromethylanilino)nicotinic acid (obtained by reaction of thionyl chloride with the acid) dissolved in 250 ml. of anhydrous benzene are treated with a solution of 6.5 g. of piperidinoethanol in 50 ml. of anhydrous benzene, added slowly. The mixture is then heated for 2 hours under reflux and allowed to crystallise overnight. The filtered product, after washing with a very small amount of benzene and then with diethyl ether and drying, weighs 11.6 g. After recrystallisation from 5 volumes of isopropanol it melts at the same temperature as the product obtained by method A.

EXAMPLE 8

10.7 g. of 2-(2′,3′-dimethylanilino)nicotinic acid, 6 g. of beta-diethylaminoethyl chloride and 40 ml. of anhydrous isopropanol are heated under reflux for 3 to 4 hours. On cooling, beta-diethylaminoethyl ester of 2-(2′,3′-dimethylanilino)nicotinic acid hydrochloride crystallises as yellowish needles. The yield is quantitative. The product may, if desired, be recrystallised from ethanol or anhydrous isopropanol. It then melts at 214° C. (inst. on a Kofler bench). This compound is soluble in water at ordinary temperature to the extent of about 2%. The pH of the aqueous solution is close to 6.

*Analysis.*—Calculated for $C_{20}H_{27}N_3O_2$. HCl (percent): Cl, 9.38; N, 11.12. Found (percent): Cl, 9.55; N, 11.40.

EXAMPLE 9

12 g. of 2-anilino-nicotinic acid in 25 ml. of anhydrous isopropanol are heated under reflux with 7.6 g. of β-diethylaminoethyl chloride for eight hours. The mixture is filtered after standing overnight, and the solid is recrystallised from 150 ml. of isopropanol to yield 12 g. of the β-diethylaminoethyl ester of 2-anilino-nicotinic acid hydrochloride, M.P. 175° C. (Kofler bench), which is soluble in water and gives a yellow solution.

*Analysis.*—Calculated for $C_{18}H_{24}Cl\ N_3O_2$ (percent): Cl, 10.13; N, 12.01. Found (percent): Cl, 10.27; N, 11.95.

EXAMPLE 10

A solution of 12 g. of β-pyrrolidino-ethanol in 150 ml. of anhydrous benzene is added dropwise and with stirring to 30 g. of 2-(m-trifluoromethylanilino)-nicotinic acid chloride dissolved in 500 ml. of anhydrous benzene. The mixture is thereafter heated for 3 hours under reflux and left to crystallise overnight at ambient temperature. After filtration 38 g. of β-pyrrolidino-ethyl ester of 2-(m-trifluoromethylanilino)-nicotinic acid hydrochloride (91.3% of theory), M.P. 178° C., are obtained. Recrystallisation from isopropanol yields 31.5 g. of pure product, M.P. 180°–181° C. (Kofler bench). This compound is very soluble in water.

*Analysis.*—Calculated for $C_{19}H_{21}Cl\ F_3N_3O_2$ (percent): Cl, 8.52; N, 10.10. Found (percent): Cl, 8.56; N, 10.04.

EXAMPLE 11

2 g. of β-[4-(1-phenyl)piperazino] ethanol dissolved in 20 ml. of anhydrous benzene are added to 3 g. of 2-(m-trifluoromethylanilino)-nicotinic acid chloride dissolved in 30 ml. of anhydrous benzene and the mixture is heated for 2 hours under reflux on an oil bath. After standing overnight at ambient temperature, the crystals which have settled out are filtered off, washed with benzene and then with diethyl ether, and dried at 100° C. About 3 g. of β-[4-(1-phenyl)-piperazino] ethyl ester of 2-(m-trifluoromethylanilino)-nicotinic acid hydrochloride are obtained, and purified by recrystallisation from about 30 volumes of isopropanol. The instantaneous melting point is then 192° C. (Kofler bench). This hydrochloride is very sparingly soluble in cold water, but soluble in hot water, and recrystallises in the hydrated state.

*Analysis.*—Calculated for $C_{25}H_{26}ClF_3N_4O_2$ (percent): Cl, 7.0; N, 11.05. Found (percent): Cl, 7.23; N, 11.03.

EXAMPLE 12

5.16 g. (0.02 mol) of 2-p-phenetidino)-nicotinic acid suspended in 40 ml. of anhydrous isopropanol are treated with 3.2 g. of β-diethylaminoethyl chloride (0.023 mol). The mixture is heated under reflux on an oil bath. After one hour and 15 minutes, the mixture has set solid. After cooling it is filtered, washed with isopropanol and dried. 7.6 g. of β-diethylaminoethyl ester of 2-(p-phenetidino)-nicotinic acid hydrochloride are obtained, as a yellow solid melting at about 200° C. It is recrystallised from 25 volumes of isopropanol and fine yellow felted needles are obtained. This hydrochloride is rather soluble in cold water, and very soluble in luke warm water. The instantaneous melting point is 198°–200° C.

*Analysis.*—Calculated for $C_{20}H_{24}ClN_3O_3$ (percent): Cl, 9.09; N, 10.77: Found (percent): Cl, 8.8; N, 10.74.

EXAMPLE 13

3.93 g. (0.015 mol) of 2-(2-methyl-3-chloranilino)-nicotinic acid, 25 ml. of anhydrous isopropanol and 2.7 g. (0.02 mol) of β-chlorethyldiethylamine are heated under reflux on an oil bath for 3 hours. After ten minutes heating, crystallisation starts. β-Diethylaminoethyl ester of 2-(2-methyl-3-chloranilino)-nicotinic acid hydrochloride is filtered off and after cooling, washed with cold isopropanol and then with a little diethyl ether, and dried at 100° C. Recrystallisation from ethanol at 95° C. yields 5 g. of white needles melting on the Kofler bench at between 220° and 230° C. (with decomposition). This hydrochloride is sparingly soluble in cold water and soluble in luke warm water. The pH of the resulting solution is 6.

*Analysis.*—Calculated for $C_{19}H_{25}Cl_2N_3O_2$: percent ionisable Cl (1 Cl) 8.9; percent total Cl (2 Cl) 17.8 percent. Found: percent ionisable Cl (1 Cl) 8.89; percent total Cl (2 Cl) 17.65 percent.

EXAMPLE 14

1.8 g. of 2-(3-trifluoromethyl-4-chloranilino)-nicotinic acid, 0.9 g. of β-chlorethyldiethylamine and 15 ml. of isopropanol are heated under reflux for 8 hours. After completion of heating a further 10 ml. of isopropanol are added and the mixture is filtered. The crude crystalline product is recrystallised from 35 ml. of isopropanol to yield 1.2 g. of pure β-diethylaminoethyl ester of 2-(3-trifluoromethyl-4-chloranilino)-nicotinic acid hydrochloride, M.P. 190° C. on the Kofler bench. This hydrochloride is rather soluble in cold water and soluble in luke warm water.

*Analysis.*—Calculated for $C_{19}H_{22}Cl_2F_3N_3O_2$: percent total Cl, 15.67; percent ionisable Cl, 7.83. Found: percent total Cl, 15.28; percent ionisable Cl, 7.63.

The therapeutic effects of the new compounds have been demonstrated by experiment.

(1) *Acute toxicity.*—This is very low for all the new compounds.

| Compound of Example | $LD_{50}$, in mg./kg., administered orally | |
|---|---|---|
| | Rat | Mouse |
| 1 | >4,000 | >3,000 |
| 2 | 1,500 | 1,520 |
| 3 | >1,600 | >2,400 |
| 5 | >4,000 | >4,000 |
| 6 | >4,000 | >4,000 |
| 7 | >4,000 | >3,000 | a The $LD_{50}$ was determined after 48 hours.

(2) *Anti-inflammatory effect.*—A dose of 400 mg./kg., administered orally, of the various compounds of the invention, causes the following inhibition of carragenine oedema in rats.

29% for the compound of Example 1
41% for the compound of Example 2
37% for the compound of Example 3
9% for the compound of Example 5
42% for the compound of Example 6
52% for the compound of Example 7
37% for the compound of Example 8

(3) *Anti-pyretic effect.*—The new compounds completely suppress the hyperthermy caused in rats by subcutaneous injection of beer yeast. The anti-pyretic effect is proportional to the doses administered.

(4) *Analgesic effect.*—The new compounds are all effective in reducing or suppressing the pain reactions caused by intraperitoneal injection of phenylbenzylquinone in mice.

(5) *Local anaesthetic effect.*—In the Bulbring and Wajda test, the compounds of the invention have a powerful local anaesthetic effect. This effect is greater than that of lidocaine in the case of the compounds of Examples 2, 3 and 8 and similar to that of lidocaine in the case of the compounds of Examples 1 and 7.

More particularly, the compound of Example 6, the hydrochloride of the β-morpholinoethyl ester of 2-(m-trifluoromethylanilino)-nicotinic acid has valuable anti-inflammation, analgesic and antipyretic properties, whilst being less toxic, less ulcerigenic and better tolerated gastrically than 2-(m-trifluoromethylanilino)-nicotinic acid.

The invention includes within its scope pharmaceutical compositions comprising one or more of the compounds of Formula I, as base or non-toxic acid addition salt, in association with a compatible pharmaceutical diluent in amount such that the said compound or compounds can be administered directly.

The new compositions may, for example, take one of the following pharmaceutical forms: capsules, tablets, or dragées containing a dose of 250 mg./unit for oral administration at the rate of 4 units per day; suppositories containing a dose of 250 mg./unit for rectal administration; or ointments and liniments containing 5% of active product for topical application.

We claim:

1. An ester of 2-anilino-nicotinic acid of the formula:

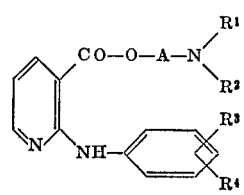

in which A is straight-chain or branched lower alkylene; $R^1$ and $R^2$ taken together with the nitrogen atom to which they are attached, are pyrrolidino, piperidino or morpholino; and $R^3$ and $R^4$ are identical or different and each is hydrogen, halogeno, lower alkyl, lower alkoxy or trifluoromethyl, or a non-toxic acid addition salt thereof.

2. The ester according to claim 1 which is the β-morpholinoethyl ester of 2-(m-trifluoromethyl-anilino)-nicotinic acid, or a non-toxic acid addition salt thereof.

3. The ester according to claim 1 which is the β-piperidinoethyl ester of 2-(m-trifluoromethyl-anilino)-nicotinic acid, or a non-toxic acid addition salt thereof.

4. The ester according to claim 1 which is the β-pyrrolidinoethyl ester of 2-(m-trifluoromethyl-anilino)-nicotinic acid, or a non-toxic acid addition salt thereof.

References Cited

UNITED STATES PATENTS

| | | | |
|---|---|---|---|
| Re. 26,655 | 8/1969 | Sherlock et al. | 260—295.5 |
| 3,454,587 | 7/1969 | Littell et al. | 260—295.5 |

ALEX MAZEL, Primary Examiner
J. TOVAR, Assistant Examiner

U.S. Cl. X.R.
260—293.69, 295.5; 424—248